United States Patent
Gonikberg

(10) Patent No.: US 7,031,416 B2
(45) Date of Patent: Apr. 18, 2006

(54) DETERMINISTIC DISTORTION INSENSITIVE ADAPTIVE RECEIVER USING DECISION UPDATING

(75) Inventor: Mark Gonikberg, Los Altos Hills, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 11/066,872

(22) Filed: Feb. 25, 2005

(65) Prior Publication Data

US 2005/0141650 A1    Jun. 30, 2005

Related U.S. Application Data

(63) Continuation of application No. 09/447,142, filed on Nov. 23, 1999, now Pat. No. 6,865,239.

(60) Provisional application No. 60/146,779, filed on Jul. 31, 1999.

(51) Int. Cl.
    *H04B 1/10* (2006.01)
(52) U.S. Cl. .................................. 375/350
(58) Field of Classification Search ................ 375/259, 375/295, 316, 285, 296, 350, 346; 370/522, 370/523, 498, 464
    See application file for complete search history.

(56) References Cited

U.S. PATENT DOCUMENTS

| | | | |
|---|---|---|---|
| 5,029,167 A | 7/1991 | Arnon et al. | |
| 5,801,695 A | 9/1998 | Townshend | |
| 5,809,075 A | 9/1998 | Townshend | |
| 5,835,538 A | 11/1998 | Townshend | |
| 5,859,872 A | 1/1999 | Townshend | |
| 5,875,229 A | 2/1999 | Eyuboglu et al. | |
| 5,970,103 A | 10/1999 | Townshend | |
| 5,999,109 A | 12/1999 | Norrell et al. | |
| 6,104,730 A | 8/2000 | Marks | |
| 6,108,354 A | 8/2000 | Scull et al. | |

(Continued)

FOREIGN PATENT DOCUMENTS

| WO | WO 98/17044 | 4/1998 |
|---|---|---|
| WO | WO 99/21288 | 4/1999 |

OTHER PUBLICATIONS

International Telecommunication Union, "A Digital Moden and Analogue Modern Pair For Use on the Public Switched Telephone Network (PSTN) at Data Signaling Rates of Up to 56 000 Bits/s Downstream and up to 33 600 Bit/s Upstream," V.90, Series V: Data Communication over the Telephone Network, Sep. 1998, pp. 1-51.

(Continued)

*Primary Examiner*—Mohammed Ghayour
*Assistant Examiner*—Pankaj Kumar
(74) *Attorney, Agent, or Firm*—Christie, Parker & Hale, LLP

(57) ABSTRACT

A technique has been developed whereby an adaptive receiver may employ decision updating in a manner insensitive to RBS. One realization achieves nearly-ideal training of an adaptive equalizer of a modem during $TRN_{1d}$ training despite potential RBS in a digital portion of the PSTN. Updates in the exemplary realization are based upon the true value of the corresponding equalizer output (the decision) and insensitive to RBS. Adaptive equalizer realizations improve equalizer training by treating the received signal as a sequence of blocks of 24 symbols with 24 corresponding separate decision values. In an exemplary variation, equalizer training begins using a single pair of decision points for coefficient updating. After gross convergence of the equalizer coefficients is achieved the update broadens to include updating each of 24 decision points and the equalizer coefficients.

25 Claims, 4 Drawing Sheets

U.S. PATENT DOCUMENTS

| | | | |
|---|---|---|---|
| 6,115,395 | A | 9/2000 | Norrell et al. |
| 6,118,813 | A | 9/2000 | Lai |
| 6,389,064 | B1 | 5/2002 | Dholakia et al. |
| 6,434,233 | B1 | 8/2002 | Bjarnason et al. |
| 6,459,729 | B1 * | 10/2002 | Lai .............................. 375/231 |
| 6,512,787 | B1 | 1/2003 | Tung et al. |

OTHER PUBLICATIONS

Telecommunications Industry Association, "North American Telephone Network Transmission Model for Evaluating Analog Client and Digitally Connected Server Modems," TIA Standard Draft, PN 3857 Draft 15, May 2000, pp. i-vii and 1-97.

* cited by examiner

DETERMINISTIC DISTORTION INSENSITIVE ADAPTIVE RECEIVER USING DECISION UPDATING

CROSS-REFERENCE TO RELATED APPLICATION(S)

This application is a continuation of application Ser. No. 09/447,142, filed Nov. 23, 1999, now U.S. Pat. No. 6,865, 239, entitled "Deterministic Distortion Insensitive Adaptive Receiver Using Decision Updating," naming Mark Gonikberg as inventor, which claims benefit of U.S. Provisional Application No. 60/146,779, filed Jul. 31, 1999.

BACKGROUND OF THE INVENTION

1. Field of the Invention

The present invention relates to data communications, and more particularly, to adaptive receiver techniques using decision updating.

2. Description of the Related Art

Much of the public switched telecommunications network (PSTN) is implemented using digital data transport. Nonetheless, significant portions of the PSTN are still based on analog technology. For example, the "local loop" portion of PSTN that connects a telephone subscriber to a central office (CO) is typically an analog loop.

A current generation of 56 Kbps modems no longer assumes that both ends of a communications path may be analog and suffer impairment due to quantization noise introduced by analog-to-digital converters (ADCs). Instead, such modems are designed to exploit configurations in which there is only one analog portion in a downstream transmission path from a digitally connected server modem to a client modem connected to an analog local loop. This assumption is reasonable in areas where most Internet Service Providers (ISPs) and business customers are digitally connected to the network and allows data signaling rates of up to 56 Kbps in the downstream transmission path.

Although a variety of similar designs are available, modems conforming to the ITU-T Recommendation V.90 are illustrative. See generally, ITU-T Recommendation V.90, *A Digital Modem and Analogue Modem Pair for Use on the Public Switched Telephone Network (PSTN) at Data Signalling Rates of up to 56 000 Bit/S Downstream and up to 33,600 Bit/S Upstream* (09/98). Recommendation V.90 defines a method for signaling between a modem connected to an analog loop (the analog modem) and a modem connected to the digital trunk (the digital modem). Modems in accordance with Recommendation V.90 take advantage of this particular arrangement to increase the data signaling rate from the digital modem towards the analog modem. In particular, detrimental effects of quantization noise can be avoided if there are no analog-to-digital conversions in the downstream path from the digital V.90 modem to the analog modem. In such cases, the PCM codes from the digital modem are converted to discrete analog voltage levels in the local CO and are sent to the analog modem via the analog local loop. The analog modem's receiver then reconstructs the discrete network PCM codes from the analog signals received.

Using current techniques, 56 Kbps signaling rates can be achieved. However, signaling rates may be limited by distortion introduced in the digital backbone itself. One source of distortion is Robbed Bit Signaling (RBS). RBS is an in-band signaling technique used in some portions of the PSTN to perform control functions such as conveyance of ring and call progress indications in the telephone network. In short, RBS involves modification by the PSTN of data transmitted thereover. In particular, a least significant bit (LSB) of certain PCM codewords may be used (or usurped) by a portion of the digital backbone. Though RBS is generally acceptable when codewords carry a voice signal, RBS effectively acts as noise or distortion and may limit the information carrying capacity of a communications channel that includes a portion employing it.

Recognizing these limitations, techniques have been developed for detecting, characterizing and mitigating RBS. For example, U.S. Pat. No. 5,875,229 to Eyubolglu et al. proposes detection and characterization of RBS during a "training" phase prior to other training operations such as initialization of equalizer coefficients. Eyubolglu's characterization technique is based on counting LSB values equal to logic zero and logic one in each of 24 intervals of a received training signal. U.S. Pat. No. 5,859,872 to Townshend also proposes a scheme in which RBS is detected during an initial training phase. In Townshend, a decoder first attempts to equalize a received training signal having a known pattern by minimizing the difference between its output and the known pattern under the assumption that no bit robbing has occurred. The decoder then measures the average equalized values at each of six phases and determines for each phase which of 4 bit robbing schemes (including no bit robbing) has been employed. Once the bit robbing that occurred in each phase is determined, the equalization process is rerun, since the first equalization was performed without knowledge of the bit robbing.

SUMMARY

An alternative technique has been developed whereby adaptive equalization may be employed using decision updating in a manner insensitive to RBS. Although techniques in accordance with some realizations of the present invention may be employed in data communications systems, methods and devices during a training phase of operation, variants may also be employed during other phases of operation, including during data modes. In addition, the techniques described herein may be employed generally to adaptive receiver structures including, but not limited to, equalizers, echo cancellers, timing recovery structures, and adaptive filter implementations. Furthermore, some realizations may exploit the techniques described herein to provide insensitivity to sources of periodic deterministic distortion other than RBS. Nonetheless, some aspects of the present invention will be best understood in the context of a specific exemplary realization.

One such exemplary realization of the present invention described herein achieves nearly-ideal training of an adaptive equalizer of a modem during $TRN_{1d}$ training despite potential RBS in a digital portion of the PSTN. Rather than updating equalizer coefficients based on decisions that have been perturbed by RBS, updates in the exemplary realization, are based upon the true value of the corresponding equalizer output (the decision) that is insensitive to RBS.

Adaptive equalizer realizations in accordance with the present invention improve equalizer training by treating the received signal as a sequence of blocks of 24 symbols with 24 corresponding separate decision values. In an exemplary variation, equalizer training begins using a single pair of decision points for coefficient updating. After gross convergence of the equalizer coefficients is achieved the update broadens to include updating each of 24 decision points (repeated in round-robin sequence) as well as the equalizer coefficients. Since RBS disturbances introduced in the digital portion of the PSTN are guaranteed to be periodic with a period no greater than 24, each of the 24 ideal decision points is fixed even when RBS is present. The joint updating of decision points and equalizer coefficients is capable of producing a zero-error condition in the absence of noise.

In a modem in accordance with the present invention employing the two-point training step at the $TRN_{1d}$ stage, the equalizer is more accurately trained than would be the case with conventional coefficient updating. This improved training accuracy improves the performance of digital impairment learning (DIL) at a later stage of modem training, and contributes to a very flexible, self-adjusting modem that requires very little a priori knowledge about the types of RBS disturbances that may be encountered in the downstream channel. Accordingly, such a modem may employ the techniques described herein during data operations using a data symbol sequence (rather than, or in addition to, a training sequence) and decision mechanisms commensurate with the larger set of symbols typically employed during data operations.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Adaptive signal processing techniques are commonly used in data communications devices. In general, receiver structures may be adapted to particular characteristics of a communications channel during a training interval by employing a training sequence of known characteristics. Suitable methods are well known in the art. For example, when establishing a connection between a digital (server) modem and an analog (client) modem, a training procedure is performed by the analog modem as defined in ITU-T Recommendation V.90, *A Digital Modem and Analogue Modem Pair for Use on the Public Switched Telephone Network (PSTN) at Data Signalling Rates of up to 56,000 Bit/S Downstream and up to 33 600 Bit/S Upstream* (09/98), the entirety of which is incorporated by reference herein. As part of that training procedure, the digital modem transmits a two-point training sequence, $TRN_{1d}$, that is used by the analog (client) modem to train its adaptive equalizer. This training works by adjusting the coefficients of the equalizer to drive to zero the estimated mean-square value of the error in the equalizer output. The error is the difference between the actual equalizer output and that produced by an ideal equalizer in the otherwise-identical situation.

Although adaptive techniques are employed during receiver training, similar techniques may be employed during data modes of receiver operation. Training sequences of symbols are designed for the initial convergence problems faced by an adaptive receiver after a new communications channel has been established. However, time varying line conditions and drift often require that a receiver adapt during data transmission. Although signal characteristics associated with data sequences of symbols are typically more complex than those associated with training sequences, the receiver already closely tracks the characteristics of the communication channel and adaptations during data operations are comparatively small. Adaptive receiver techniques described herein, though illustrated primarily in the context of training, are generally applicable to training and data phases of operation. Nonetheless, based on the description herein, persons of ordinary skill in the art will appreciate suitable applications of the described techniques to both training and data phases of operations. Similarly, the adaptive receiver techniques described herein are generally applicable to data communications, though illustrated primarily in the context of equalization in an analog PCM modem configuration and a particular source of deterministic distortion, namely RBS. These and other suitable configurations will be better appreciated by persons of ordinary skill in the art based on the specification and claims that follow.

Adaptive Equalization Using Decision Updating in PCM Modem Training

Figure 1:
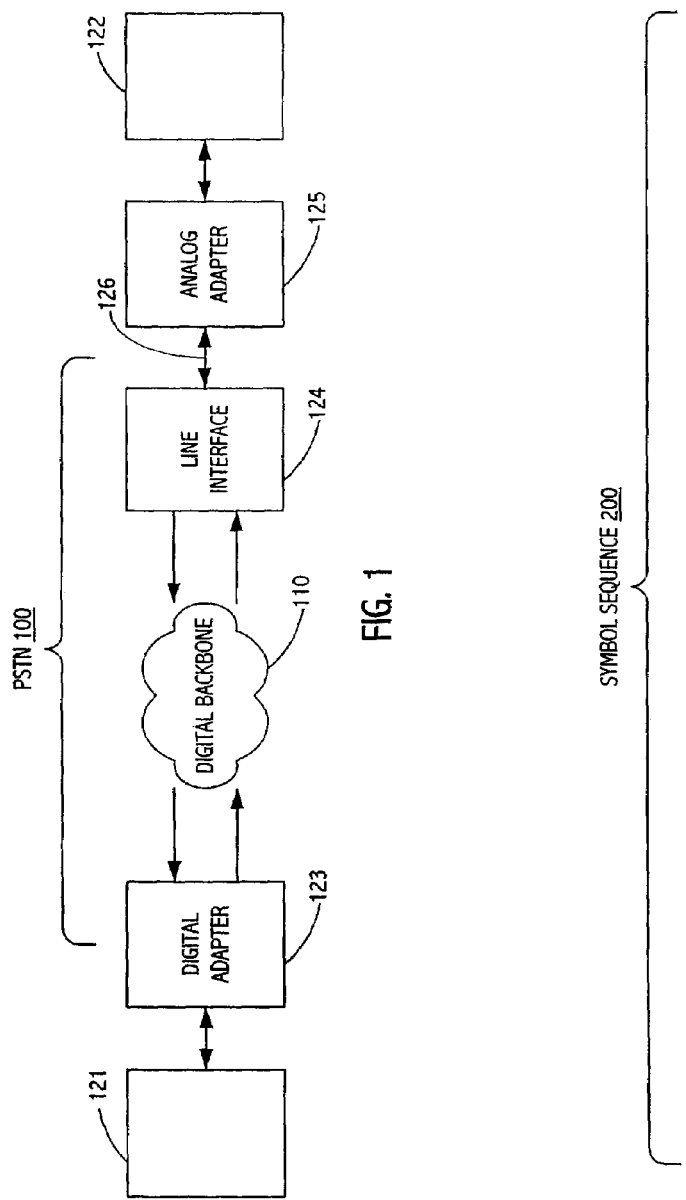
FIG. 1 depicts a typical communications configuration in which RBS may be employed and in which an analog adapter embodiment in accordance with the present invention may be configured with an RBS insensitive adaptive receiver.

Referring to FIG. 1, digital networks such as PSTN 100 often include portions (e.g., in digital backbone 110) that employ robbed bit signaling (RBS) or exhibit other digital impairments that introduce disturbances that have a very small effect on the perception of voice and analog modem signals. In an exemplary configuration, data processing equipment 121, such as an internet server or gateway thereto, communicates with a digital adapter 123, such as a digital V.90 modem, during data communications with data processing equipment 122, e.g., a user's computer. Digital adapter 123 transmits a sequence of symbols over digital backbone 110 to line interface 124. Line interface 124 in turn, transmits baseband-modulated signals on local loop 126. Analog adapter 125, e.g., an analog V.90 modem, receives the baseband signals and may, in turn, equalize and sample the baseband signal, detect the binary information in the demodulated signal and supply results to data processing equipment 122. A reverse path from analog adapter 125 to digital adapter 123 may be constructed using conventional analog modem signaling techniques, for example, V.34 technology, or other suitable techniques. See generally, U.S.

Pat. Nos. 5,875,229 and 5,859,872 as well as ITU-T Recommendation V.90 for a description of digital/analog modem pair technology.

Traditional equalization techniques update an equalizer, such as that employed in analog modem 125, using an error signal that is not zero when RBS is present. For example, the LMS algorithm frequently-used to update equalizer coefficients is based on the fundamental assumption that the error signal can be reduced by suitable adjustment of the equalizer coefficients. When RBS is present, this fundamental assumption is violated.

Figure 2:
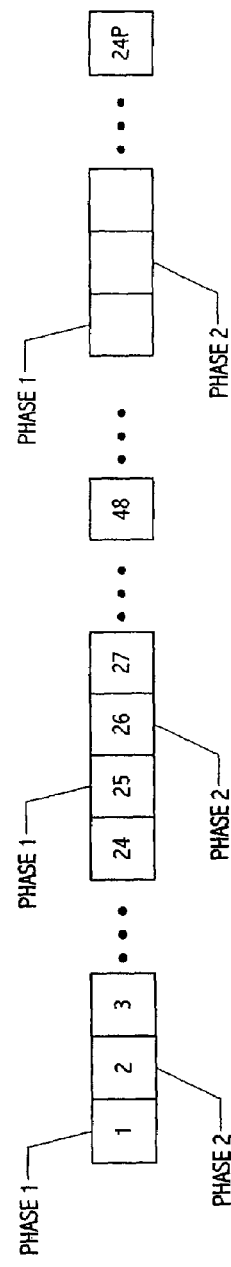
FIG. 2 illustrates various timing phases of a symbol sequence, which in some realizations may be or include a training sequence.

FIG. 2 depicts a symbol sequence 200 such as that transmitted by digital adapter 123 over digital backbone 110. In general, some symbols, namely those PCM code words transmitted in an interval affected by RBS, may be modified by digital backbone 110. A given source of RBS tends to affect every $6^{th}$ PCM code word and depending on the type employed, may force least significant bits (LSBs) of affected code words to logic 1, to logic 0, or to logic 1 in some intervals and logic 0 in others. See generally, U.S. Pat. Nos. 5,875,229 and 5,859,872 for a discussion of RBS types employed in the digital PSTN. Although a most basic period for RBS is six intervals, it has been observed that RBS, if employed is guaranteed to exhibit a period of twenty-four intervals. Therefore, as illustrated, a given symbol sequence can be viewed as exhibiting twenty-four timing phases, e.g., phase 1, phase 2, . . . phase 24.

In the description that follows, it will be appreciated that symbol sequence 200 may encode training information, e.g., as a training sequence such as the two-point training sequence, $TRN_{1d}$, transmitted by digital adapter 123 so that analog adapter 125 may train its adaptive equalizer. Alternatively (or additionally), symbol sequence 200 may encode data, such as that communicated from data processing equipment 121 to data processing equipment 122. In any case, the RBS insensitive techniques described herein may be employed to adapt receiver structures of a communications device. In the case of adaptation using a training sequence, decision mechanisms are simplified due to the limited subset of symbols included. For example, a simple adaptive slicer may be employed. In the case of adaptation performed during transmission of a data sequence, a more complete set of symbols will typically be encoded. Accordingly, decision mechanisms that adaptively update decision regions may be employed. In general, persons of ordinary skill in the art will appreciate a range of variations based on the illustrative two-point equalizer training configuration now described.

Glossary of Terms

To set forth useful nomenclature for describing the present invention and its features and advantages, the followings terms are defined as follows:

| | |
|---|---|
| A | idealized equalizer output |
| $A^{(n)}_m$ | positive decision at timing phase m and time n |
| $A'^{(n)}_m$ | negative decision at timing phase m and time n |
| d(n) | decision at time n |
| $h^{(n)}(k)$ | $k^{th}$ equalizer coefficient, at time n |
| k | time index |
| K | number of equalizer coefficients |
| m | time index denoting one of 24 timing phases |
| $\mu_d$ | updating gain for decision points |
| $\mu_h$ | updating gain for equalizer coefficients |
| n | time index |
| ucode | universal code used to describe a PCM code word. Cf. Table 1/V.90. |

In an exemplary realization in accordance with the present invention, an exemplary $TRN_{1d}$ phase of modem training follows procedures defined in ITU-T Recommendation V.90, but further divides this phase of training into *Initial Training* and *Final Training*. The equalizer coefficients are updated during Initial Training, and both the equalizer coefficients and the decision values are updated during Final Training.

Figure 3:
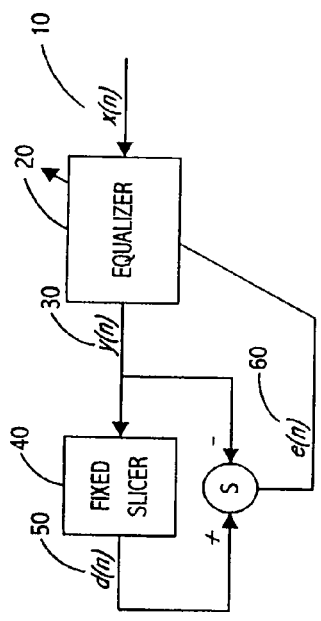
FIG. 3 is a block diagram of an adaptive equalizer configuration in accordance with an exemplary embodiment of the present invention for use during an initial phase of training using a two-value training sequence.

Prior to $TRN_{1d}$ the training sequence imparts synchronization information to the analog modem so it is meaningful to declare that $TRN_{1d}$ begins at n=0. During $TRN_{1d}$ the digital (server) modem transmits a pseudo-random binary sequence encoded such that one of the binary values corresponds to a positive ucode (chosen by the analog modem during an earlier phase of training); the other binary value corresponds to the negative form of the same ucode. The analog (client) modem passes received sequence 10 of amplitudes, {x(n)} through its adaptive equalizer 20 as illustrated in FIG. 3. The equalizer is a finite impulse response (FIR) structure with taps {h(k);k=0,K−1}. The equalizer computes output 30, y(n), using the formula $$y(n) = \sum_{k=0}^{K-1} h(k)x(n-k). \quad (1)$$

Ideally, each y(n) output from equalizer 20 is one of two unique amplitudes, A or −A, depending on whether the amplitude corresponding to the transmitted ucode is positive or negative. During Initial Training the equalizer output 30 y(n) is passed through a fixed slicer 40 which computes decision sequence 50 d(n) using the formula:

$$d(n) = A \; \text{sgn}(y(n)) \quad (2)$$

where $$\text{sgn}(x) = 1 \; \text{if} \; x \geq 0, \quad (3)$$
$$= -1, \text{otherwise.}$$

The difference between each y(n) and its corresponding d(n) defines an error 60, e(n) given by:

$$e(n)=d(n)-y(n). \quad (4)$$

This error is used to update the coefficients of equalizer 20 using the formula:

$$h^{(n)}(k)=h^{(n-1)}(k)+\mu_h e(n)x(n-k) \; \text{for} \; k=0,1,\ldots,K-1. \quad (5)$$

Initial Training continues until the observed average value of e(n) is sufficiently small at which point final training can begin. For convenience, initial training continues until n=0 (mod 24).

Figure 4:
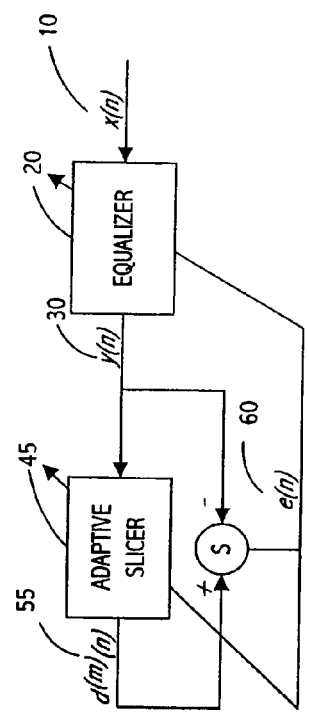
FIG. 4 is a block diagram of the adaptive equalizer configuration in accordance with an exemplary embodiment of the present invention for use during decision update phase of training using a two-value training sequence.

During final training, fixed slicer 40 is replaced by an adaptive slicer 45 as illustrated in FIG. 4. Adaptive slicer 45 maintains a list of decision amplitudes, $\{A^{(n)}_m, A'^{(n)}_m; m=0, 1, \ldots 23\}$ corresponding to separate decisions at each of 24 time phases indexed by m in effect at time n. At the beginning of final training, $A^{(n)}_m = A$ and $A'^{(n)}_m = -A$ for m=0,1, . . . , 23 and n=0,1, . . . , 23.

For each n during final training, adaptive slicer 45 computes a decision:

$$d(n) = A_m^{(n)} \text{ if } y(n) \geq 0 \quad (6)$$
$$\phantom{d(n)} = A_m'^{(n)} \text{ otherwise}$$

where $$m = n(\text{mod } 24). \quad (7)$$

Then, the coefficients of equalizer 40 are updated using formula (5) above, and the decision is updated as well. The formulas for the decision update are $$A^{(n+24)}{}_m = (1-\mu_d)A^{(n)}{}_m + \mu_d y(n) \text{ if } y(n) \leq 0 \quad (8)$$

$$A'^{(n+24)}{}_m = (1-\mu_d)A'^{(n)}{}_m + \mu_d y(n) \text{ otherwise} \quad (9)$$

where Equation (7) continues to apply to Equations (8) and (9). Unselected decision amplitudes, e.g., $A'^{(n)}{}_m$ if $y(n)<0$, are typically propagated without update although for realizations in which much larger symbol sets must be discriminated, e.g., complete alphabets during data modes, decision amplitudes or regions for unselected symbols may also be updated. Updating gains, $\mu_h$ and $\mu_d$, are typically selected empirically for a given implementation. In general, higher gains provide faster convergence, but greater susceptibility to noise. On the other hand, lower gains provide greater noise immunity at the cost of slower convergence. In some implementations, updating gains may be varied over time (e.g., for higher gain and faster convergence initially with lower gain and greater noise immunity after initial convergence). Persons of ordinary skill in the art will appreciate suitable gains for a given implementation and noise environment.

Substituting for y(n) in accordance with Equation (4), Equations (8) and (9) may be recast as:

$$A^{(n+24)}{}_m = A^{(n)}{}_m - \mu_d e(n) \text{ if } y(n) \geq 0 \quad (10)$$

$$A'^{(n+24)}{}_m = A'^{(n)}{}_m - \mu_d e(n) \text{ otherwise} \quad (11)$$

in accordance with the illustration of FIG. 4.

Given the joint updating of decisions and equalizer coefficients and based on the description herein, persons of ordinary skill in the art will recognize the possibility that corresponding updates may saturate the dynamic range of the numeric coding scheme, particularly in the case of fixed precision arithmetic implementations. Accordingly, some implementations in accordance with the present invention may constrain at least one or the other of decision and equalizer coefficient updating. One suitable implementation includes fixing a decision value, e.g., $A^{(n)}{}_m$, for one of the timing phases, m. Alternatively, a power constraint can be imposed on the set of decision values, e.g., $\{A^{(n)}{}_m, A'^{(n)}{}_m; m=0,1, \ldots 23\}$, or partial set thereof, to avoid an unbounded march through decision and equalizer coefficient encoding space for a particular arithmetic. Equalizer coefficients may be similarly constrained, e.g., by fixing a single coefficient.

Figure 5:
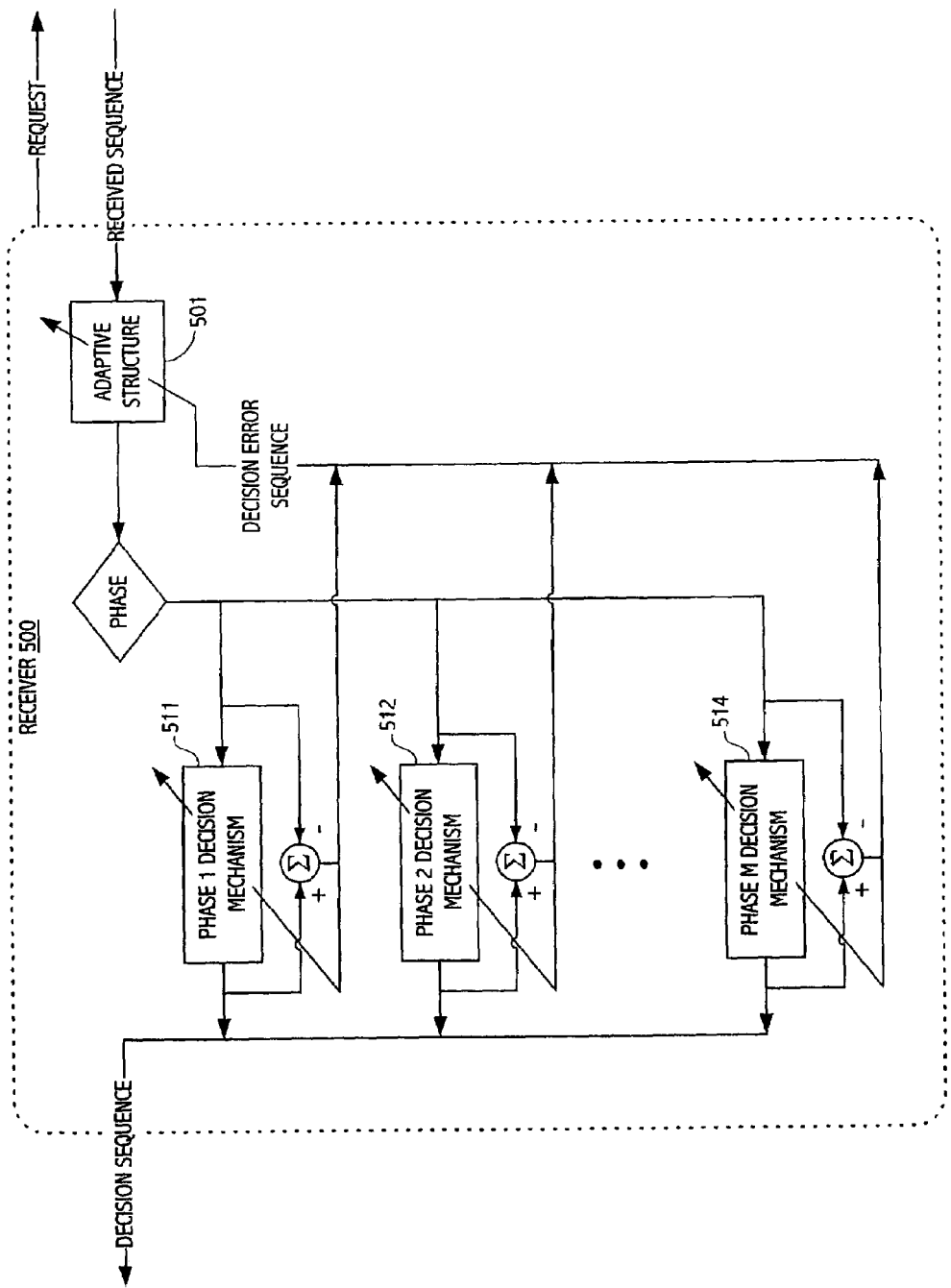
FIG. 5 is a block diagram depicting a receiver employing adaptive update of a filter using a decision sequence calculated with a timing-phase-specific adaptive decision mechanism in accordance with an exemplary embodiment of the present invention.

Although some aspects of the present invention have been illustrated in the context of a particular equalizer embodiment, the invention is not limited thereto. For example, building on the illustration above, FIG. 5 depicts a receiver employing adaptive update of a signal processing structure using a decision sequence calculated with a timing-phase-specific adaptive decision mechanism in accordance with an exemplary embodiment of the present invention. An adaptive structure 501 of receiver 500, which may in general include an equalizer, echo canceller, timing recovery structure, filter or other adaptive structure, receives a signal or sequence corresponding to a symbol sequence that has been transmitted over a communications channel subject to a source of deterministic distortion such as RBS. Adaptive structure 501 is updated using techniques such as those described above based on a decision error sequence corresponding to decision values calculated separately for each of M timing phases of the received sequence. Receiver 500 identifies the timing phase corresponding to a received value and calculates a decision using a corresponding decision mechanism (e.g., phase 1 decision mechanism 511, phase 2 decision mechanism 512, . . . or phase M decision mechanism 514). In a two-point training realization, the decision mechanisms may include adaptive slicers such as that described above. Alternatively, multi-value decision techniques appropriate for larger numbers of possible decision amplitudes, e.g., in the case of multi-value training or data sequences, may also be employed. In multi-value decision realizations, decision region updating will typically be employed.

Figure 6:
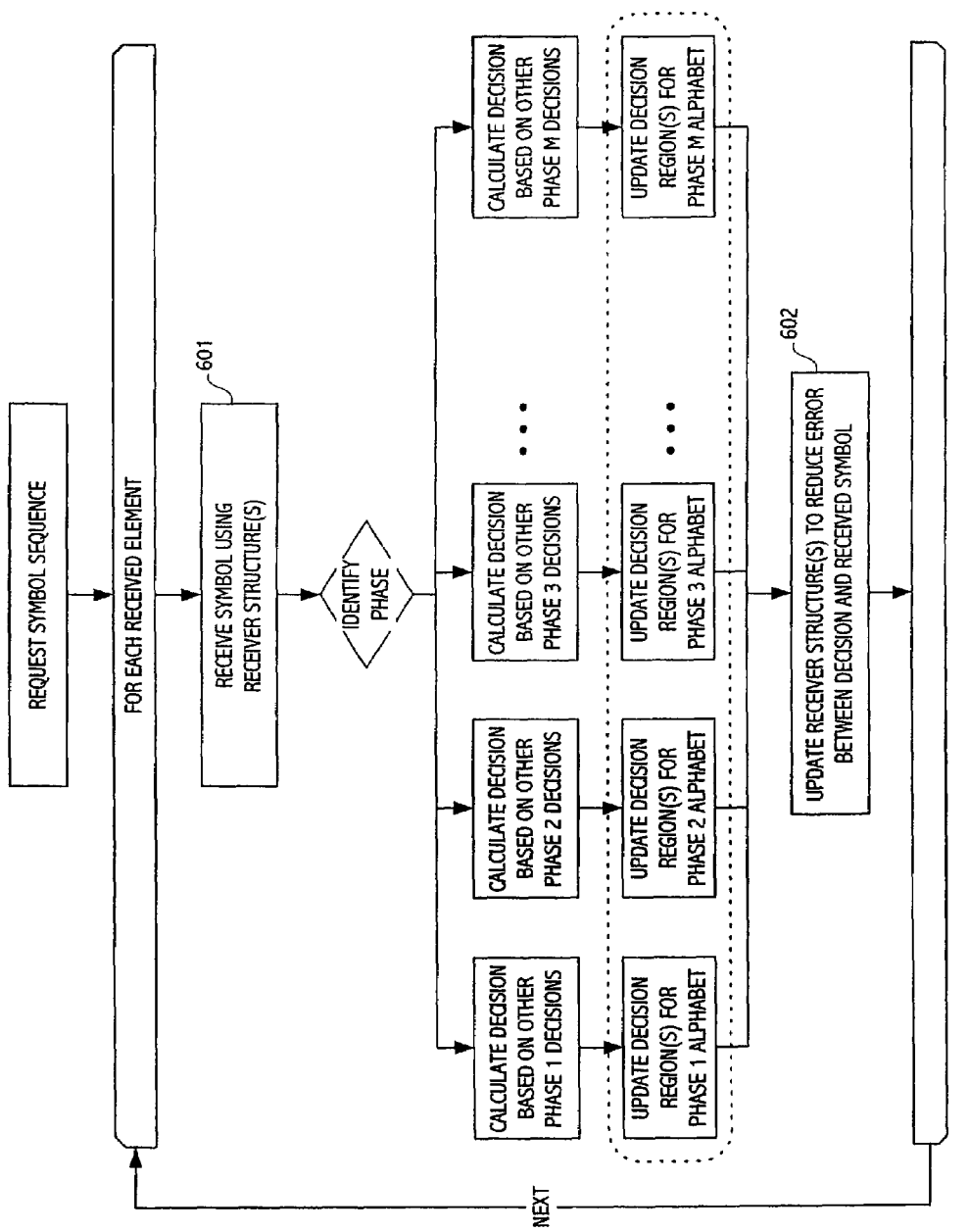
FIG. 6 is a flowchart depicting operation of a deterministic distortion insensitive adaptive receiver configuration employing decision updating in accordance with an exemplary embodiment of the present invention.

FIG. 6 depicts (in the form of a flow chart) operation of a deterministic distortion insensitive adaptive receiver configuration employing decision updating in accordance with an exemplary embodiment of the present invention. As before, for each element of a received signal, a symbol is received (601) using an adaptive receiver structure (or structures). The received symbol corresponds to a particular timing phase and, based on the corresponding adaptive decision process, a decision is calculated. The adaptive decision processes are based on in-phase received symbols only to ensure insensitivity to deterministic distortion that is periodic in M timing phases. Although decision algorithms such as those described above are typically iterative based on the received symbol and a decision value and/or decision region calculated from previously received symbols, other algorithms may also be employed. Note that the realization of FIG. 6 contemplates the possibility of differing symbol sets (or alphabets) in the various timing phases. Nonetheless, in some realizations, the alphabet employed in each timing phase is the same. Based on a decision sequence assembled from the outputs of M separate decision processes, receiver structures are updated (602) using any suitable techniques.

In general, techniques described herein allow adaptive receivers, particularly an adaptive equalizer of an analog PCM modem to be more accurately trained than possible with conventional adaptive techniques. More generally, the techniques described herein allow for improved adaptive operation of receiver structures during data operations or training. Furthermore, although the description herein has emphasized a source of deterministic distortion particular to the PSTN, namely RBS, the techniques employed may be more generally applied to adaptive signal processing configurations in which a particular source of deterministic distortion is guaranteed to be periodic in an interval. These and other suitable configurations will be better appreciated by persons of ordinary skill in the art based on the specification and claims that follow.

Embodiments have been described largely without regard to a particular implementation environment. While software implementations of the invention are contemplated, the teachings disclosed herein may also be used by persons of ordinary skill in the art to implement the present invention in a hardware or mixed hardware/software context without departing from the scope of the invention. Based on the description herein, persons of ordinary skill in the art will appreciate a variety of applications of the underlying techniques and the breadth of the appended claims. Without limitation thereto, the exemplary V.90 modem $TRN_{1d}$ training configuration provides a useful example.

What is claimed is:

1. A method of mitigating effects of deterministic distortion in a communications channel, the method comprising:
    causing a symbol sequence of known characteristics to be transmitted over the communications channel;
    for individual ones of M timing phases of the symbol sequence, separately calculating and adaptively updating decisions based at least in part on one or more previous decisions corresponding to the respective timing phase for individual ones of the M timing phases together defining a decision sequence;
    adapting a receiver to reduce error between the decision sequence and the symbol sequence; and
    constraining a decision update to a fixed value for one of the M timing phases,
    wherein the deterministic distortion is guaranteed to be periodic in M.

2. A method of mitigating effects of deterministic distortion in a communications channel, the method comprising:
    causing a symbol sequence of known characteristics to be transmitted over the communications channel;
    for individual ones of M timing phases of the symbol sequence, separately calculating and adaptively updating decisions based at least in part on one or more previous decisions corresponding to the respective timing phase for individual ones of the M timing phases together defining a decision sequence; and
    adapting a receiver to reduce error between the decision sequence and the symbol sequence, wherein the deterministic distortion is guaranteed to be periodic in M, and wherein the adaptive updating comprises separately updating decisions for individual ones of the M timing phases in round-robin sequence.

3. The method of claim 1, wherein the communications channel includes a digital portion of a Public Switched Telecommunications Network (PSTN); and wherein a source of the deterministic distortion includes Robbed-Bit Signaling (RBS) in the digital portion of the PSTN.

4. The method of claim 1, wherein the symbol sequence of known characteristics includes particular symbols selected from a known alphabet thereof; but wherein a particular sequence of the particular symbols is not necessarily known.

5. The method of claim 1, wherein the symbol sequence of known characteristics includes, for each phase thereof, two or more particular symbols selected from a respective known alphabet thereof.

6. The method of claim 5, wherein the respective known alphabets are the same for all phases.

7. The method of claim 5, wherein the two or more particular symbols are the same for all phases.

8. The method of claim 1, wherein the symbol sequence includes a two-value sequence; and wherein the decisions calculating includes adaptive slicing.

9. The method of claim 1, wherein the symbol sequence includes plural values selected from an alphabet; and wherein the decisions calculating includes adapting decision regions, individual decision regions corresponding to elements of the alphabet.

10. The method of claim 9, wherein the decision regions are single-dimensional.

11. The method of claim 9, wherein the decision regions are multi-dimensional.

12. The method of claim 1, wherein the symbol sequence is received as an amplitude sequence; and wherein the decisions calculating includes adapting decision amplitudes corresponding to alphabet elements included in the symbol sequence.

13. The method of claim 1, further comprising:
    for individual elements, y(n), of a received signal corresponding to the symbol sequence, computing an enumeration of decision amplitudes $\{A_m, A'_m\}$, based on one or more other decision amplitudes of a same timing phase.

14. The method of claim 1, further comprising:
    for individual elements, y(n), of a received signal corresponding to the symbol sequence, updating one or more decision values $\{A_m^1 \ldots A_m^2\}$ and corresponding decision regions based on one or more other decision values of a same timing phase, m, wherein L denotes the order of an alphabet from which elements of the symbol sequence are selected, and wherein m=n(mod M).

15. The method of claim 14, wherein L=2; and wherein elements of the symbol sequence corresponding to $A_m^1$ and $A_m^2$ are opposing forms of a same code.

16. A Robbed-Bit Signaling (RBS) insensitive method of adapting a receiver of a communications device, the method comprising:
    receiving an analog sequence of amplitudes corresponding to a sequence of Pulse Code Modulation (PCM) codewords transmitted over a digital portion of the Public Switched Telecommunications Network (PSTN); and
    jointly updating decision values and at least one adaptive structure of the receiver, wherein the decision value updating is performed separately for individual ones of M timing phases based at least in part on one or more previous decisions corresponding to the respective timing phase, M being selected to ensure that the RBS, if any, is periodic therein, wherein M is 24 and individual ones of 24 separately updated decision values is fixed with respect to the RBS, which, if present, has one or more periodic components guaranteed to be periodic in a timing phase interval.

17. The method of claim 16, wherein the codeword sequence includes a data sequence; and wherein the jointly updating is performed during a data phase of receiver operation.

18. The method of claim 16, further comprising:
    performing an initial phase of training prior to the joint updating, the initial phase continuing with a single pair of decision points at least until gross convergence of the at least one adaptive structure.

19. The method of claim 16, further comprising:
    performing a Digital Impairment Learning (DIL) phase of training, the DIL phase of training benefiting from the RBS insensitive training performed prior thereto.

20. The method of claim 16, wherein the symbol sequence includes a two-point training sequence of PCM codewords chosen pseudo-randomly from two values that are negatives of each other.

21. A communications device for connection to a communication network wherein information units transmitted thereover may be altered by deterministic distortion in a digital portion thereof, the communications device comprising:
    a receiver operable on a received signal to produce a received sequence corresponding to a symbol sequence of known characteristics transmitted over the communication network, the symbol sequence includes a training sequence;

a decision mechanism operable to generate a decision sequence, wherein elements of the decision sequence are separately calculated for individual ones of M timing phases based at least in part on one or more previous decisions corresponding to the respective timing phase, and wherein M is selected such that the deterministic distortion is guaranteed to be periodic in a period defined by the M timing phases;

an adaptive update mechanism operable to update the receiver to reduce error between the decision sequence and the symbol sequence and operable at least during a training phase, wherein the training phase includes first and second portions; and an initial decision mechanism operable during the first portion to achieve at least gross convergence of the receiver, wherein the decision mechanism is operable thereafter during the second portion.

22. The communications device of claim 21, wherein the receiver includes one or more of an equalizer, an echo canceller, timing recovery structures, and an adaptive filter; and wherein the adaptive update mechanism is operable to update one or more of the equalizer, the echo canceller, the timing recovery structures, and the adaptive filter.

23. The communications device of claim 21, wherein the symbol sequence includes a data sequence; and wherein the adaptive update mechanism is operable at least during a data transmission interval.

24. A computer program encoded on a computer readable medium, said program comprising:

instructions executable on at least one processor to at least partially implement a receiver of communications device, said instructions including a training subset thereof executable to adapt the receiver to reduce error between a decision sequence and a training sequence of known characteristics received via a communications channel that may exhibit deterministic distortion, the training subset of instructions separately calculating decisions for individual ones of M timing phases of the received training sequence based at least in part on one or more previous decisions corresponding to the respective timing phase, successive of the decisions for individual ones of the M timing phases together defining a decision sequence wherein the deterministic distortion is guaranteed to be periodic in M such that the decisions are fixed with respect to the deterministic distortion, wherein said instructions include a subset thereof executable to maintain individual decision amplitudes corresponding to seperate decisions for individual ones of M timing phases.

25. The computer program product as in claim 24 encoded by or transmitted in at least one computer readable medium selected from the set of a disk, tape or other magnetic, optical, or electronic storage medium and a network, wireline, wireless or other communications medium.

* * * * *